United States Patent [19]

Svensson

[11] Patent Number: 4,750,916
[45] Date of Patent: Jun. 14, 1988

[54] METHOD AND ARRANGEMENT FOR CLEANSING A FLOW OF HOT CONTAMINATED GAS

[75] Inventor: Björn Svensson, Växjö, Sweden

[73] Assignee: Fläkt AB, Nacka, Sweden

[21] Appl. No.: 10,691

[22] Filed: Feb. 4, 1987

[30] Foreign Application Priority Data

Feb. 6, 1986 [SE] Sweden ................ 8600536

[51] Int. Cl.⁴ .............. B03C 3/01; B01D 50/00; B01D 51/00
[52] U.S. Cl. .............................. 55/5; 55/9; 55/11; 55/13; 55/83; 55/97; 55/126; 55/135; 55/267; 55/315; 55/343
[58] Field of Search ............ 55/5, 6, 9, 11, 80, 55/126, 135, 267, 268, 315, 343, 13, 118, 83, 97

[56] References Cited

U.S. PATENT DOCUMENTS

| | | | |
|---|---|---|---|
| 1,329,859 | 2/1920 | Schmidt et al. | 55/11 X |
| 1,508,367 | 9/1924 | Matlock | 55/135 X |
| 2,002,860 | 5/1935 | Levy | 55/6 X |
| 2,174,185 | 9/1939 | Carter | 55/315 X |
| 2,277,663 | 3/1942 | Francis et al. | 55/135 X |
| 2,675,891 | 4/1954 | Frey | 55/9 X |
| 3,395,512 | 8/1968 | Finney, Jr. et al. | 55/80 |
| 3,477,203 | 11/1969 | Luge et al. | 55/9 |
| 3,899,308 | 8/1975 | Petersson | 55/126 X |
| 4,375,982 | 3/1983 | Chitil | 55/11 X |

FOREIGN PATENT DOCUMENTS

| | | | |
|---|---|---|---|
| 561508 | 10/1932 | Fed. Rep. of Germany | 55/126 |
| 2027365 | 10/1972 | Fed. Rep. of Germany | 55/267 |
| 2414350 | 9/1979 | France | 55/80 |
| 153382 | 12/1979 | Japan | 55/11 |
| 134593 | 10/1919 | United Kingdom | 55/11 |
| 316626 | 8/1930 | United Kingdom | 55/135 |
| 686794 | 1/1953 | United Kingdom | 55/267 |
| 2112015 | 7/1983 | United Kingdom | 55/267 |
| 526372 | 11/1976 | U.S.S.R. | 55/80 |

Primary Examiner—Kathleen J. Prunner
Attorney, Agent, or Firm—Burns, Doane, Swecker & Mathis

[57] ABSTRACT

The invention relates to a method and an arrangement for cleansing a flow of hot contaminated gas (1), in which the contaminants comprise both dust particles and gaseous condensable contaminants. The gas is cooled in a heat exchanger in a first stage (2) to a temperature which lies above the temperature at which the gaseous contaminants begin to pass into their respective liquid phases. The gas is then cooled further, in a second stage (4), by mixing the gas with a colder gas flow (5), so as to bring the temperature of the gas to a level suitable for subsequent extraction of contaminants in a first dust separator (3, 3a), while condensing part of the gaseous contaminants present. Condensed contaminants are bound by adsorption and/or absorption to dust particles collected in the first dust separator (3, 3a).

26 Claims, 1 Drawing Sheet

METHOD AND ARRANGEMENT FOR CLEANSING A FLOW OF HOT CONTAMINATED GAS

TECHNICAL FIELD

The present invention relates to a method for cleansing a hot flow of contaminated gas, thereby to create conditions for improved separation of said contaminants.

The invention is particularly suited for use when the aforesaid contaminants comprise solid particles dispersed throughout the hot gas flow, preferably dust particles freely suspended in the gas flow, and also gaseous contaminants which are dispersed throughout the gas flow and which when cooled pass into a liquid state.

The invention is primarily intended for improving and/or simplifying separation of those gaseous contaminants present that are capable of passing to a liquid phase when the temperature of the gas is lowered.

The invention also relates to an arrangement for creating in a contaminated flow of process gas, preferably metallurgical industrial gas, in which the contaminants comprise partly discrete, solid dust particles dispersed throughout the gas flow and partly gaseous contaminants dispersed throughout the flow, conditions for improved separation of the contaminants, and in particular for improved separation of the gaseous contaminants present, thereby to enable the apparatus used to be kept clean more easily and more readily, and to facilitate handling and possible destruction of the separated contaminants.

BACKGROUND PRIOR ART

Various arrangements of apparatus are known for extracting contaminants from a contaminated gas flow.

These arrangements are highly diversified, and are constructed to meet the degree of extraction desired and to suit the nature of the contaminants concerned.

For example, when the contaminants concerned consist of finely divided, discrete solid dust particles, it has earlier been proposed to provide barrier filters, so-called hose filters, where the contaminated gas flow is forced to pass through fine-mesh fabric hoses, in which the solid contaminants adhere to the hoses and a cleansed gas flow exits therefrom.

It is also known to extract solid contaminants from a contaminated gas flow in an electrostatic dust precipitator, in which the gas flow is passed through an electric field so as to electrically charge the solid particles contained in the gas, these charged particles being attracted to a collecting electrode.

The prior art in this field also includes various methods and apparatus for separating both solid contaminants and gaseous contaminants from a contaminated gas flow.

A common example of such apparatus or arrangements are those in which a contaminated gas flow is passed through various kinds of gas scrubbers, in which the contaminated gas is caused to bubble through a liquid bath, or is sprayed with liquid droplets arranged to fall through the flow of gas, normally in counter-flow therewith, or in which liquid is finely dispersed in the gas flow, so as to obtain an agglomerating effect between dust particles and water particles, the larger particles or agglomerates being subsequently extracted from the gas flow in a so-called cyclone, by centrifugation.

It is also known that condensable gaseous contaminants can be extracted from a contaminated gas flow, by causing the contaminants to condense against cooling surfaces specifically constructed herefor and brought to a temperature at which condensation will take place, or by causing the contaminants to condense on cold liquid droplets, which are subsequently removed from the system in a known manner.

In the case of gas flows contaminated with both solid dust particles and gaseous contaminants, it is also known in the art to first separate the solid particles from the gas flow and then to separate the gaseous contaminants from the gas flow that has been cleansed of solid particles, by causing the gaseous contaminants to react with an absorption material, and then to separate the reacted absorption material in a known manner.

SUMMARY OF THE PRESENT INVENTION

Technical Problems

With regard to the present state of the art as described above, and when observing the prior art measures adopted when the contaminated hot gas flow to be cleansed has dispersed therein solid dust particles and gaseous, condensable contaminants, it will be understood that a qualified technical problem resides in providing conditions which will enable improved separation of said condensable contaminants to be effected more readily, and then particularly the separation of the gaseous contaminants present in the gas.

A further technical problem in this regard is one of providing conditions, with the aid of simple means, which enable the contaminants present in the hot gas flow to be effectively separated, so that the major part of the gaseous condensable contaminants are collected as condensate in a continuous process, thereby enabling said contaminants to be removed from the process, while the solid dust particles adhere to and collect in a barrier filter.

Despite solving the aforementioned technical problems, a more pronounced technical problem resides in creating conditions in which the thermal energy carried by the gas flow can be recovered for other purposes. Particular problems arise when a major part of the thermal energy bound to the contaminated gas flow is to be utilized.

It will also be understood that a further technical problem resides in the creation, with the aid of simple means, of conditions which will enable a contaminated gas flow to be cooled to an extent such as to enable large quantities of heat to be recovered without condensing the gaseous contaminants present in the gas, and of initiating condensation of the gaseous contaminants with the aid of a cold flow of gas, whereafter the contaminant condensates and solid dust particles are extracted from the gas flow in a barrier filter. This latter cooling of the gas can be effected in the absence of cooling surfaces specifically constructed for this purpose.

A further technical problem encountered when cleansing contaminated gas flows in accordance with the aforedescribed recommendations resides in the provision of conditions under which an adjusted proportion of the gaseous contaminants present will pass to a liquid state and under which the thus formed condensate will bind to the solid particles present in the gas, these particles preferably having the form of dust.

It will be understood that a more pronounced technical problem in this regard is one of extracting from the gas condensable, gaseous compounds which obtain a tacky consistency when passing into their respective liquid states.

Another technical problem is one of enabling, with the aid of simple means, tacky contaminants to be separated from a gas flow without creating the additional cleansing problems arising when the contaminants are transferred to circulating water.

A further highly technical problem also encountered in the present regard is one of creating conditions for improved separation of contaminants from a flow of process gas originating from a metallurgical industrial plant, such as the process gas generated in reduction furnaces, when the contaminants comprise hydrocarbons.

Another qualified technical problem is one of providing a contaminant separation plant capable of extracting contaminants effectively from said process gas flow, irrespective of the fuel used as a reduction agent in the metallurgical process.

When using in metallurgical industrial processes fuels which give rise to condensable contaminants in the exiting gases, e.g. gases exiting from a reduction furnace, a further problem resides in the provision of a method and an arrangement which will effectively reduce in the gas the amount of contaminants which would otherwise normally condense on cooling surfaces in the flue gas system.

Another technical problem resulting herefrom is one of providing an arrangement in which all, or substantially all, of the gaseous contaminants will condense onto surfaces particularly constructed and suitable herefor.

It is known that a fuel switch from metallurgical coke to residual products from oil refineries results in an increased quantity of condensable contaminants in the flow of process gas, and consequently a technical problem resides in the creation of conditions which enable the entire process gas cleaning plant to be constructed in a manner to prevent spontaneous condensation of gaseous products in the gas cleansing plant. Spontaneous condensation of these gaseous products would result in disturbances in operation.

A further technical problem is one of providing conditions which will enable a large part of the heat contained in the contaminated gas flow to be recovered, irrespective of the fuel used as a reduction agent in the metallurgical process.

Another technical problem in the present context is one of creating conditions which will enable dust to be readily removed from a dust separator, such as a hose filter, despite the dust being highly imflammable or pyrophoric, and in which the removal can be effected with the aid of an inert gas.

A further technical problem resides in providing a method and an arrangement of apparatus in which residual thermal values in the dust and the contaminants removed from the process can be utilized, while a particular technical problem resides in the provision of a method and an arrangement of apparatus in which this energy can be returned to the process.

It will also be understood that a further technical problem resides in providing a method and an arrangement of apparatus for utilizing residual energy contents in the form of non-combusted gaseous contaminants, which can be considered particularly advantageous when this energy can be used in the industrial process in which the gas was generated.

SOLUTION

The present invention primarily relates to a method for cleansing a contaminated flow of hot gas, in which the contaminants comprise particulate dust material and gaseous, condensable contaminants. In this regard, the gas is cooled in a first heat exchange stage, to a temperature which lies above, preferably in the vicinity of the temperature at which gaseous contaminants present in the gas begin to pass to their liquid phase. The gas is then cooled slightly in a second cooling stage, by mixing the gas with a colder gas flow, to a temperature suitable for separating contaminants in a subsequent first dust separator, while condensing a minor proportion of the gaseous contaminants present in the gas, these condensed contaminants being bound to the dust particles present, by adsorption and/or absorption, and collected in the first dust separator.

It is also proposed in accordance with the invention that subsequent to extracting dust in the first dust separator, the gas flow is subjected to additional cooling in a third stage, such as to bring the gas to a temperature at which at least the major part of the gaseous contaminants present pass into their liquid phase. Cooling of the gas in the third cooling stage is effected alternatively in a plurality, preferably two, parallel-connected heat exchangers.

In accordance with the invention, subsequent to being cooled in the third cooling stage the gas flow is passed through a filter, such as a further dust separator, e.g. an electrostatic dust separator, for extracting the contaminant condensates, said electrostatic dust separator having the form of a wet electrofilter, an electrostatic dust separator for separating dry contaminants against dry electrodes, or a barrier filter.

In accordance with the invention, the concentration of solid particles in the gas flow, and the size and configuration of the particles are adapted so that the liquid contaminants formed in the gas flow as a result of said cooling processes are adsorbed on and/or are absorbed by the dust particles, thereby forming liquid laden particles. The liquid content of the liquid laden particles is adapted so that the particles can be extracted from the gas flow in a manner similar to solid particles, namely in a mechanical and/or electrostatic dust separator.

In accordance with one embodiment of the invention, the gas is cooled in the first stage to a temperature of 250°–400° C., normally from a temperature of 500°–1000° C.

In accordance with a further embodiment of the invention, the gas is cooled in the second stage in a manner such that preferably at most 10% of the gaseous contaminants present in the gas are converted to a liquid phase.

Cooling of the gas in the second stage is preferably effected by admixing the gas with a cold, previously cleansed gas, thereby obviating the need of separate cooling surfaces.

In accordance with a further embodiment of the method according to the invention subsequent to passing the gas through the additional dust extraction stage, the gas flow is moderately heated to avoid condensation in the various pipes and conduits, part of this moderately heated gas flow being utilized for cooling purposes in the second stage.

The invention also relates to an arrangement of apparatus for treating a contaminated flow of process gas, preferably gas generated in a metallurgical industrial plant, where said contaminants consist of discrete dust particles and gaseous condensable contaminants distributed throughout the gas flow and carried thereby and in which arrangement conditions are created for improved separation of said contaminants, and particularly separation of the gaseous contaminants present.

The arrangement according to the invention for extracting contaminants from the contaminated flow of process gas comprises a first heat exchanger in which the process gas is cooled in a first stage to a temperature above, but preferably in the vicinity of the temperature at which the gaseous contaminants present can be expected to convert to a liquid phase. The resultant slightly cooled process gas is then passed to a mixer, in which the gas is further cooled in a second stage to a temperature suitable for treatment of the gas in a downstream first dust separator, in which part of the gaseous contaminants are converted to their liquid phase, these liquid, or condensed contaminants binding to the solid dust particles by adsorption and/or absorption, thereby to form liquid laden particles which are extracted from the gas flow in a downstream first dust separator.

In accordance with one embodiment of the invention the first dust separator is a so-called barrier filter in the form of a hose filter.

Preferably, provisions are made for heating the wall surfaces of the mixer, in order to prevent gaseous contaminants from condensing onto said wall surfaces.

When found necessary, other units or components forming part of the system may also be heated for the aforesaid reason.

The arrangement according to the invention further includes a second heat exchanger in which the gas flow is cooled in a third stage to a temperature at which all, or at least substantially all of the gaseous contaminants present pass into their liquid state. The heat exchanger unit in which the third cooling stage is effected may comprise a plurality of heat exchangers mutually connected in parallel.

The use of a multiplicity of heat exchangers enables a heat exchanger to be disconnected from the system for cleansing purposes.

Subsequent to passing through the second heat exchanger, the gas flow is passed to a further dust separator for extraction of the liquid, or condensate contaminants, this further dust separator having the form, e.g., of an electrostatic dust precipitator operating as a wet electrofilter, an electrostatic dust precipitator for separating dry contaminants against electrodes, or a barrier filter.

The invention is also based on the realization that the contaminant condensates present in the gas can be bound to the aforesaid solid particles, to form liquid laden particles, through adsorption and/or absorption processes.

These liquid laden particles can then be separated in the downstream first dust separator, in conjunction with the separation of other contaminants.

In accordance with one particular advantageous embodiment of the present invention the arrangement incorporates a gas mixer which is arranged downstream of the first heat exchanger and in which the flow of process gas is admixed with a flow of colder gas, preferably a cold flow of cleansed process gas, thereby enabling the contaminated process gas to be cooled in the absence of mechanical cooling surfaces constructed herefor.

In accordance with another embodiment of the invention the first mechanical and/or electrostatic dust separator is arranged immediately downstream of the gas mixer, in which the contaminated process gas is additionally cooled, and comprises a plurality of separators, preferably two, connected in parallel.

Finally, in accordance with a further embodiment of the invention the arrangement incorporates a third heat exchanger in which the flow of process gas, cleansed in two stages and subjected to extraction processes in two separation stages, is moderately heated in order to avoid condensation in the delivery pipes etc., and from which part of the cleansed process gas can be passed to the aforesaid gas mixer in which said gas is used as the aforementioned cold gas flow.

ADVANTAGES

The advantages primarily afforded by a method and an arrangement according to the present invention reside in the provision of conditions in which condensable, gaseous contaminants present in a hot flow of contaminated gas can be extracted more readily from said gas, particularly when the contaminated gas flow contains both solid particles and gaseous hydrocarbon contaminants, and in which the condensed contaminants can be extracted from the gas solely, or practically solely on surfaces intended herefor, thereby considerably reducing maintenance work and facilitating recovery of the extracted or separated material.

BRIEF DESCRIPTION OF THE DRAWINGS

An arrangement at present proposed for creating in a contaminated flow of process gas conditions for improved separation of contaminating impurities from the gas in accordance with the method of the invention will now be described in more detail with reference to the accompanying drawing, in which.

DESCRIPTION OF EMBODIMENTS AT PRESENT PREFERRED

Figure 1:
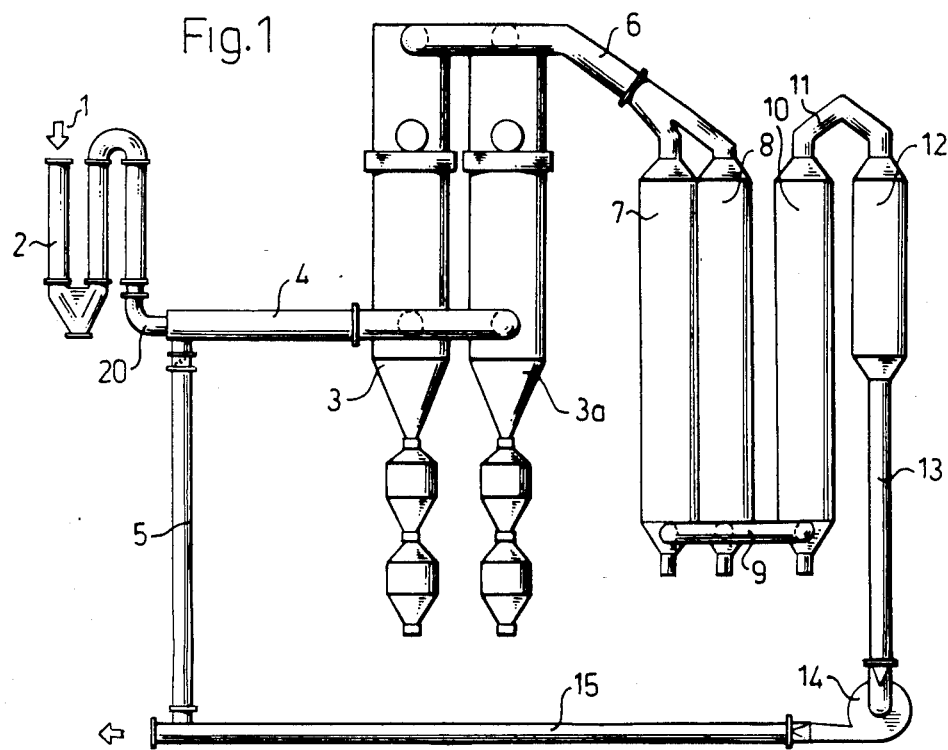
FIG. 1 illustrates an arrangement of apparatus according to the invention schematically and in side view.

In FIG. 1 the reference numeral 1 indicates a contaminated gas flow generated in a metallurgical industrial plant, such as a flow of contaminated process gas deriving from a reduction furnace.

A significant feature of the illustrated flow of process gas is that it is laden with contaminants in the form of (a) solid fines which are carried by and dispersed throughout the gas flow and (b) gaseous contaminants which are dispersed throughout the gas flow and which are liable to pass into a liquid phase when the temperature of the gas decreases.

The solid particles, or fines, distributed throughout the gas comprise metal contaminants.

The gaseous contaminants dispersed throughout the gas consist of mutually different hydrocarbons.

The primary object of the present invention is to provide conditions which will enable the gaseous condensable contaminants to be extracted from the gas flow more readily than has been possible hitherto.

As illustrated in FIG. 1, the process gas is passed through a first heat exchanger 2, where the gas relinquishes part of its thermal energy or heat. The temperature of the process gas is significantly lowered in the first heat exchanger, although not to such an extent as to cause the gaseous contaminants to pass into their liquid phase, i.e. to condense. The temperature of all wall surfaces of the first heat exchanger shall lie above the temperature at which the gaseous contaminants present pass into their liquid phases.

The cooled flow of process gas leaves the heat exchanger through a pipe 20 and is passed into a mixer 4, in which only a minor proportion, roughly 10%, of the gaseous contaminants present in the gas pass into a liquid phase and condense on the solid dust particles.

In some cases it may be suitable to heat the wall surfaces of the mixer. This can be effected through the agency of external energy sources, or by passing the hot gas over the wall surfaces prior to cooling the gas.

The gaseous contaminants converted to their respective liquid phases in the mixer 4 are therefore able to bind to the solid particles, through adsorption and/or absorption, to form liquid laden particles.

It should perhaps be mentioned here that by liquid laden particles is meant one or more particles on which a small amount of liquid has adsorbed or has been absorbed, so as to accompany the particle. However, such a particle exhibits mechanical properties which relate to solid particles. Such liquid laden particles are to be collected as dust in the dust separator, and when knocked and/or blown clean from the dust collecting surfaces of the separator are intended to leave the surfaces and fall down under the influence of their own weight, i.e. gravitationally.

The illustrated embodiment comprises two hose filters 3 and 3a. The hose filters are of a conventional kind, and will not therefore be described in detail here.

As beforementioned, and as illustrated in FIG. 1, the process gas 1 is subjected to further cooling in a gas mixer 4 located downstream of the first heat exchanger 2, this further cooling of the process gas being effected by passing to the mixer, through a pipe 5, a flow of cold gas, the temperature of which is appreciably below the temperature at which the gaseous contaminants present in the gas pass into a liquid state.

It is assumed that the cold gas used in the illustrated embodiment consists of a cleansed flow of process gas having a temperature below 100° C.

It will be observed that due to the provision of the mixer 4, the temperature of the incoming flow of contaminated process gas can be lowered without needing to provide mechanical cooling surfaces that have been designed specifically for this purpose, and without needing to pass gas flows across respective sides of such surfaces.

In order to prevent contaminants from condensing on the wall surfaces of the mixer, it is suggested that these surfaces are heated to some small extent, and that the cold gas flow is mixed with the hot gas flow in the centre of the mixer.

The process gas cleansed in the dust separator 3 is passed through a pipe 6 to one of two alternately operating second heat exchangers 7, 8, in which a predominant part of the gaseous contaminants present in the gas are condensed out. The process gas is then passed through a pipe 9 to an electrostatic precipitator 10. A so-called wet electrostatic dust precipitator is proposed in this instance, because quite considerable quantities of contaminants are condensed out, and because these contaminants can be relativley tacky.

It will be understood, however, that in the case of dry contaminant condensates, an ordinary electrostatic dust precipitator or a barrier filter can be used.

The process gas is then passed through a pipe 11 to a third heat exchanger 12.

The gas thus cleansed of solid, liquid and gaseous contaminants is removed from the third heat exchanger 12, through a pipe 13, a fan 14 and a pipe 15, part of this gas flow being taken from the pipe 15 and returned to the mixer 4, through a pipe 5, as illustrated in the Figure.

Figure 2:
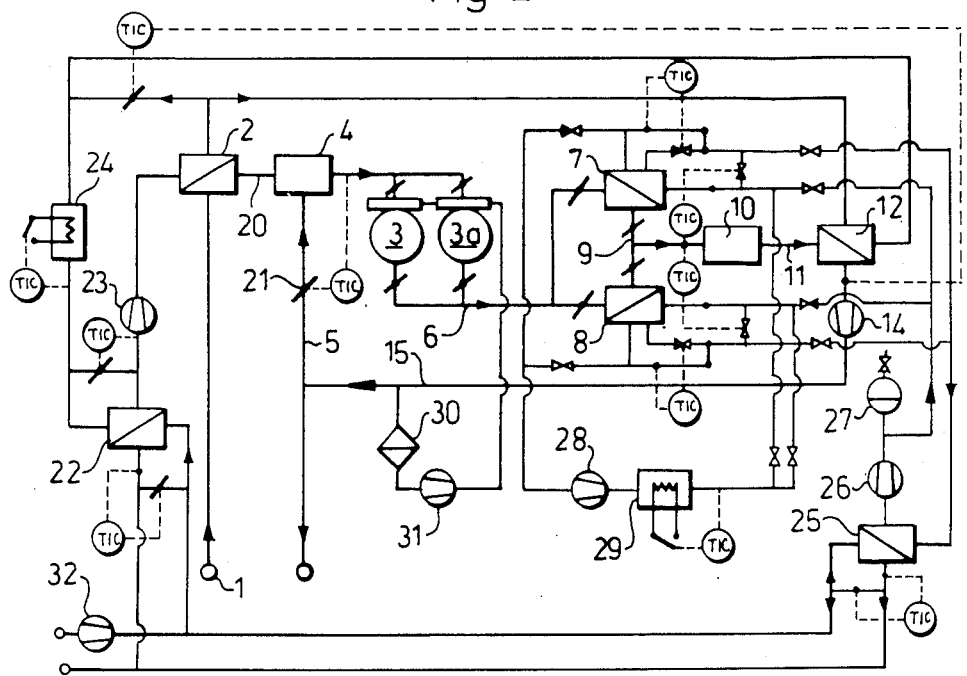
FIG. 2 is a basic flow diagram illustrating the arrangement according to FIG. 1.

FIG. 2 is a flow diagram illustrating the arrangement shown in FIG. 1.

Those apparatus in FIG. 2 which are similar to the apparatus described with reference to FIG. 1 are identified by the same reference numerals.

Referring now to both FIGS. 1 and 2, the flow of process gas 1 enters the first heat exchanger 2, which is assumed here to comprise a gas/hot-oil heat exchanger constructed to cool the gas from a temperature of 1000° C.–800° C. to about 300° C.

The gas exiting from the first heat exchanger 2 is conducted through the pipe 20 to the gas mixer, where the ratio of the incoming contaminated gas entering through the pipe 20 to the cooled, cleansed gas entering from the pipe 5 is adjusted by means of a valve 21, such that the temperature of the gas exiting from the gas mixer 4 is about 170° C., i.e. slightly higher than the temperature at which the major part of the gaseous contaminants present will pass into their liquid state. The temperature is also adjusted so that the exiting gas flow, containing a mixture of solid and liquid laden contaminants, can be readily collected in the downstream dust separator.

The gas exiting from the gas mixer 4 is passed, through a pipe, to one of two parallel-connected hose filters 3, 3a, in which the gas is cleansed of solid particles and a minor proportion of liquid laden solid particles. The gas exiting from the hose filters, and containing a high proportion of gaseous contaminants, is then passed to one of the aforementioned second heat exchangers 7, 8, which are mutually connected in parallel and in which the incoming gas is cooled to a temperature of about 65° C., with the aid of cooling water. All, or substantially all, of the gaseous contaminants present in the gas pass into a liquid state during this cooling process.

The thus cooled process gas, containing the aforesaid liquid contaminants, is now passed to the electrostatic dust precipitator 10, from where the process gas, which has thus been cleansed in a multiple of stages, is passed through the pipe 11 to the third heat exchanger 12, in which the gas is re-heated slightly, to a temperature of say 80° C., in order to avoid the possibility of condensation forming on the pipe surfaces and other apparatus in the plant.

With regard to the remainder of the apparatus, the reference 22 indicates a fourth heat exchanger, which in accordance with the illustrated embodiment is a hot-oil/starting-water heat exchanger operative in cooling the oil from temperatures of between 165° C. and 125° C.

The reference 23 indicates a hot oil pump, while the reference 24 indicates a battery for heating the oil electrically.

The reference 25 indicates a fifth heat exchanger for heat transfer between cooling water and starting water, while the reference 26 indicates a cooling water pump. The reference 27 indicates an expansion vessel.

The reference 28 indicates a second cooling water pump which is operative in increasing the pressure of the cooling water system, while the reference 29 indicates a second electrical heating battery.

The reference 30 indicates a clean gas filter, while the reference 31 indicates a clean gas processor.

Finally, the reference 32 indicates a starting water pump.

The illustrated method according to the present invention is intended for cleansing a flow of contaminated hot gas, such as hot process gas 1, which contains solid, particulate contaminants and gaseous, condensable contaminants. In this regard, the gas is cooled in a first heat exchanger stage 2, to a temperature which lies above, preferably in the vicintiy of the temperature at which the gaseous contaminants begin to pass into their respective liquid phases. The gas is then cooled further in an adjacent second stage 4, by mixing the gas with a flow of colder gas entering the cooler from the pipe 5, so as to bring the gas temperature to a level suitable for treatment of the gas in a downstream first dust separator 3, 3a, while condensing part of the gaseous contaminants present in the gas, these contaminant condensates being bound by adsorption and/or absorption to the dust particles collected in said first dust separator.

In the illustrated embodiment, the gas exiting from the first dust separator 3, 3a is passed to the third heat exchange stage 7 or 8, in which the gas is cooled further to a temperature at which at least the major part of the gaseous contaminants present are converted to their respective liquid phases.

In accordance with the illustrated embodiment, subsequent to passing the further cooling stage 7 or 8, the contaminant condensates are extracted from the gas in a further dust separator 10, e.g. an electrostatic precipitator operating as a wet electrofilter.

In the event that the quantity of dust particles present in the initial gas flow 1 is insufficient to bind the liquid laden particles formed, it is proposed that solid particles are introduced into the gas flow in a commensurate amount.

It will be understood that the invention is not restricted to the described and illustrated exemplifying embodiment thereof, and that modifications can be carried out within the scope of the following claims.

I claim:

1. A method for cleansing contaminated, hot gas flow, in which the contaminants comprise both dust particles and gaseous condensable contaminants, comprising the steps of cooling the gas flow in a first heat exchange stage to a temperature above a predetermined temperature at which the gaseous contaminants begin to pass into their respective liquid phases; mixing the contaminated gas flow with a colder gas flow in a second cooling stage, so as to bring the contaminated gas flow to a further temperature suitable for subsequent treatment of the gas in a first dust separator while converting part of the gaseous contaminants present into their respective liquid phases, the contaminant condensates thus formed being bound to dust particles collected in the first dust separator by at least one of an adsorption and absorption processes.

2. A method according to claim 1, including the steps of further cooling the gas flow in a third stage, subsequent to extracting dust from said gas flow in said first dust separator, said gas flow being cooled in said third stage to a third temperature at which at least the major part of the gaseous contaminants present in the gas are converted to their respective liquid phases.

3. A method according to claim 2, including cooling the gas flow in the third stage alternatively in at least two parallel-connected heat exchangers.

4. A method according to claim 3, including disconnecting at least one heat exchanger and cleaning said at least one disconnected heat exchanger.

5. A method according to claim 3, characterized by cleansing the gas of contaminant condensates in a further dust separator, subsequent to further cooling the gas in said third stage.

6. A method according to claim 3, including cleansing the gas of contaminant condensates in a filter, subsequent to further cooling of the gas in said third stage, said filter being in the form of an electrostatic dust precipitator operating as a wet electrofilter.

7. A method according to claim 3, including cleansing the gas of contaminant condensates in a filter, subsequent to further cooling the gas in said third stage, said filter being an electrostatic dust precipitator for extracting dry contaminants.

8. A method according to claim 3, including cleansing the gas of contaminant condensates in a filter, subsequent to further cooling the gas in said third stage, said filter being a barrier filter.

9. A method according to claim 2, characterized by cleansing the gas of contaminant condensates in a further dust separator, subsequent to further cooling the gas in said third stage.

10. A method according to claim 9, including moderately heating the gas subsequent to passing the gas through said further dust separator, and utilizing part of the heated gas as the colder gas flow in said second cooling stage.

11. A method according to claim 2, including cleansing the gas of contaminant condensates in a filter, subsequent to further cooling of the gas in said third stage, said filter being in the form of an electrostatic dust precipitator operating as a wet electrofilter.

12. A method according to claim 11, including moderately heating the gas subsequent to passing the gas through said filter, and utilizing part of the heated gas as the colder gas flow in said second cooling stage.

13. A method according to claim 2, including cleansing the gas of contaminant condensates in a filter, subsequent to further cooling the gas in said third stage, said filter being an electrostatic dust precipitator for extracting dry contaminants.

14. A method according to claim 2, including cleansing the gas of contaminant condensates in a filter, subsequent to further cooling the gas in said third stage, said filter being a barrier filter.

15. A method according to claim 1, characterized by cooling the gas flow in said first stage to a temperature of 250°-400° C.

16. A method according to claim 1, characterized by cooling the gas flow in said second stage in a manner such that at most 10% of the gaseous contaminants present in the gas are converted to their respective liquid phases.

17. A method according to claim 1, characterized by cooling the gas flow in said second stage by supplying thereto a flow of cold, previously cleansed gas.

18. A method according to claim 1, including moderately heating the gas subsequent to passing the gas through a further dust separator, and utilizing part of the heated gas as the colder gas flow in said second cooling stage.

19. A method according to claim 18, wherein the first dust separator is a barrier filter.

20. A method according to claim 19, including further cooling the gas in a second heat exchanger subsequent to said treatment in said first dust separator.

21. A method according to claim 18, including heating wall surfaces of the second cooling stage to prevent condensation of gaseous contaminants on the wall surfaces of the second cooling stage.

22. A method according to claim 18, including forming the first dust separator as a plurality of separators connected in parallel.

23. An arrangement for improved separation of contaminants, particularly gaseous contaminants, from a flow of process gas generated in a metallurgical industrial plant and which is contaminated with solid dust particles dispersed throughout the gas flow and with gaseous combustile contaminants that are dispersed throughout said gas flow, comprising a first heat exchanger to which said flow of process gas is fed and in which the process gas is cooled to a temperature above a predetermined temperature at which the gaseous contaminants pass into liquid phases; a cooling mixer disposed downstream of and in communication with said first heat exchanger so as to receive said cooled process gas and further cool said process gas to a further temperature to condense a part of the gaseous contaminants present, the condensed contaminants being bound to said solid dust particles by at least one of an adsorption and absorption process so as to form liquid laden particles; and a first dust separator disposed downstream of and in communication with said cooling mixer so as to receive said further cooled process gas and to separate said liquid laden particles from the process gas.

24. An arrangement according to claim 23, wherein a second heat exchanger is disposed downstream of and in communication with said first dust separator further cool said process gas to a temperature at which at least the major part of the gaseous contaminants pass into their respective liquid phases.

25. An arrangement according to claim 24, the second heat exchanger comprises one or more heat exchangers connected in parallel.

26. An arrangement according to claim 24, comprising a further dust separator disposed downstream of and in communication with said second heat exchanger so as to cleanse said process gas of condensed contaminants subsequent to passing from the second heat exchanger.

* * * * *